INVENTORS.
Ralph S. Zebarth
Henry E. Frederick
BY
John A. Hamilton
Attorney.

INVENTORS.
Ralph S. Zebarth
Henry E. Frederick
BY John A. Hamilton
Attorney.

Nov. 11, 1969 R. S. ZEBARTH ET AL 3,477,093
POULTRY DEFEATHERING APPARATUS
Filed Sept. 7, 1967 5 Sheets-Sheet 3
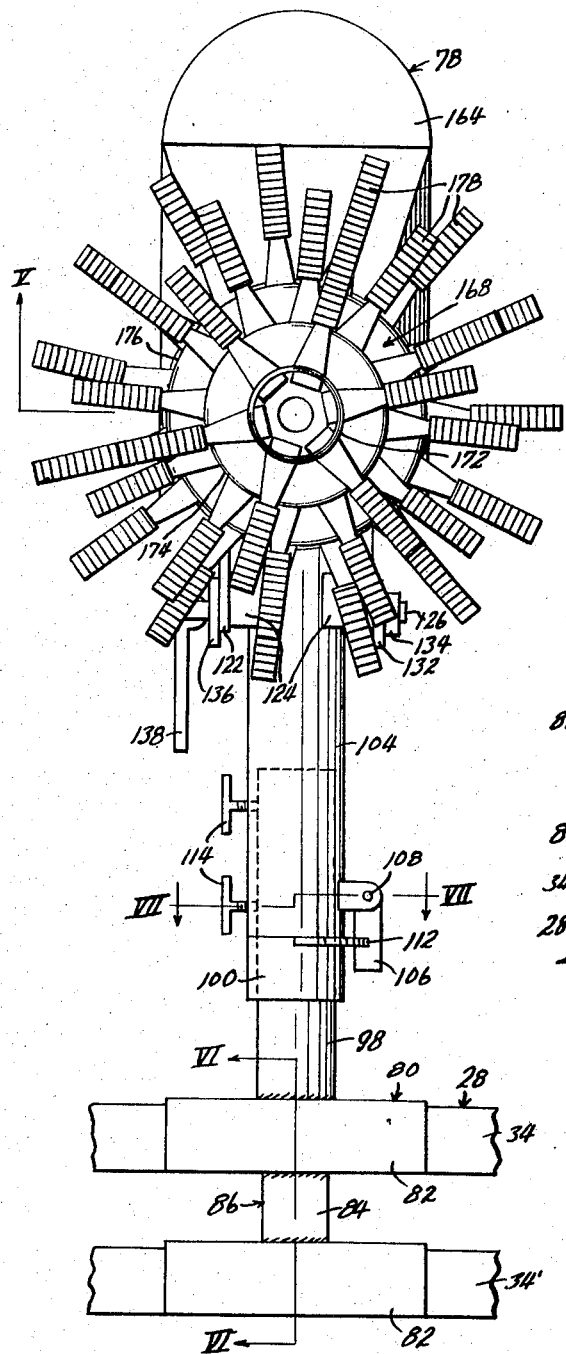
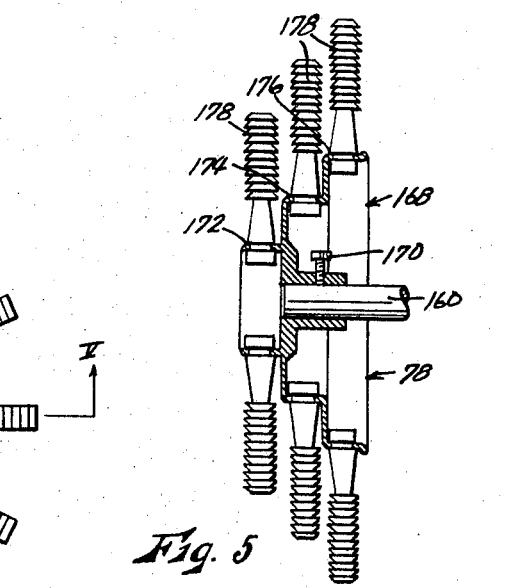
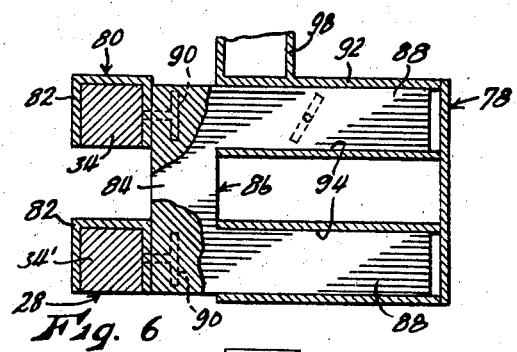
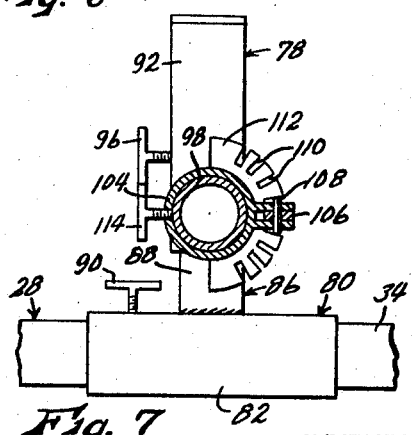
INVENTORS.
Ralph S. Zebarth
Henry E. Frederick
BY John A. Hamilton
Attorney.

Nov. 11, 1969  R. S. ZEBARTH ET AL  3,477,093
POULTRY DEFEATHERING APPARATUS
Filed Sept. 7, 1967  5 Sheets-Sheet 4
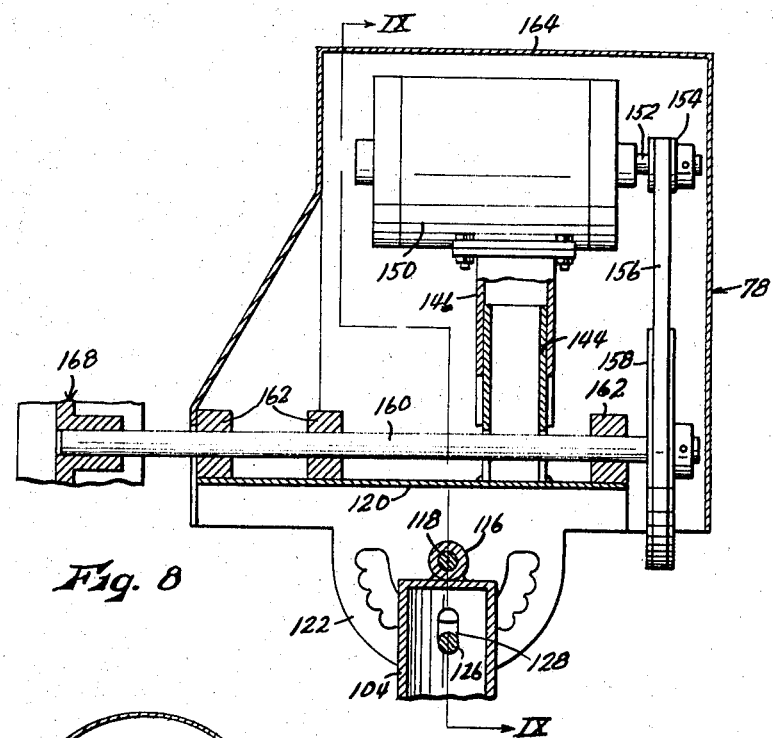
Fig. 8
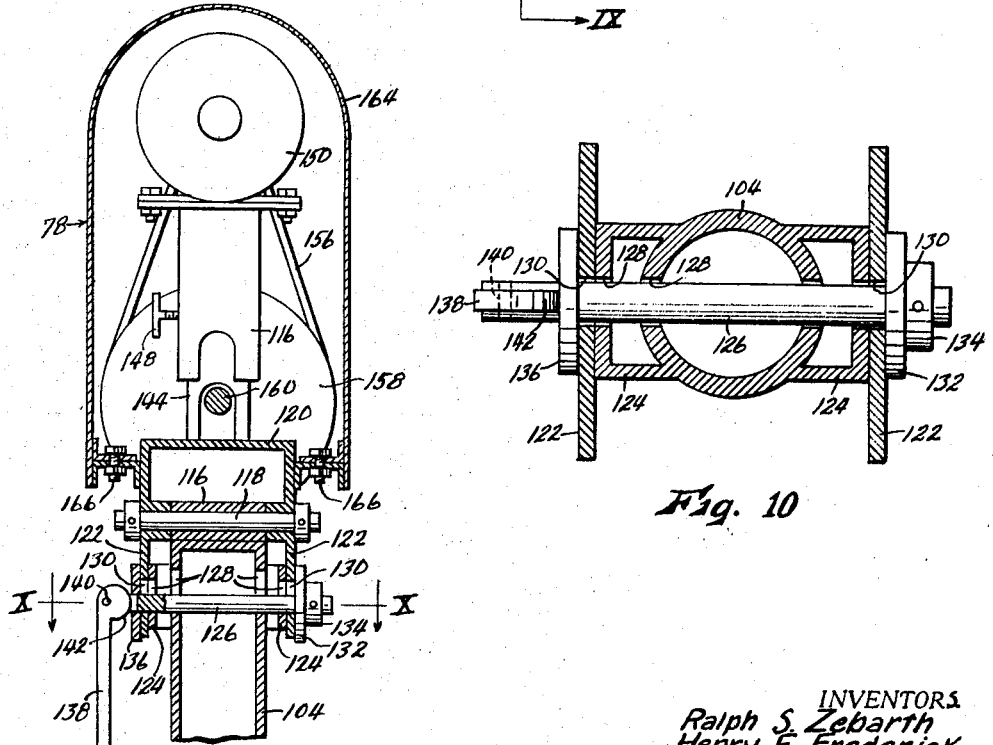
Fig. 9
Fig. 10
INVENTORS.
Ralph S. Zebarth
Henry E. Frederick
BY John A. Hamilton
Attorney.

Nov. 11, 1969  R. S. ZEBARTH ET AL  3,477,093
POULTRY DEFEATHERING APPARATUS

Filed Sept. 7, 1967  5 Sheets-Sheet 5

INVENTORS.
Ralph S. Zebarth
Henry E. Frederick
BY John A. Hamilton
Attorney.

United States Patent Office 3,477,093
Patented Nov. 11, 1969

3,477,093
POULTRY DEFEATHERING APPARATUS
Ralph S. Zebarth and Henry E. Frederick, Kansas City, Mo., assignors, by mesne assignments, to Gordon Johnson Company, Kansas City, Mo., a corporation of Missouri
Continuation-in-part of application Ser. No. 617,925, Feb. 23, 1967. This application Sept. 7, 1967, Ser. No. 666,113
Int. Cl. A22c 21/02; A22b 5/08
U.S. Cl. 17—11.1                                        5 Claims

ABSTRACT OF THE DISCLOSURE

A poultry defeathering apparatus, or "picker," comprising a series of picker heads arranged along opposite sides of the path of travel of poultry supported from shackles on a conveyor line. Each head has an axis intersecting the vertical plane of poultry travel, its rotatable about said axis, and consists of a series of cylindrical steps of graduated diameters coaxial with the rotational axis thereof, and a series of flexible picking fingers mounted in and extending radially from each of said steps. The heads are individually mounted in a frame so as to be adjustable vertically, longitudinally, and transversely with respect to the path of the poultry, and the axis of rotation of each head may be universally pivoted to adjust its angle relative to the vertical plane of poultry travel.

---

Figure 1:
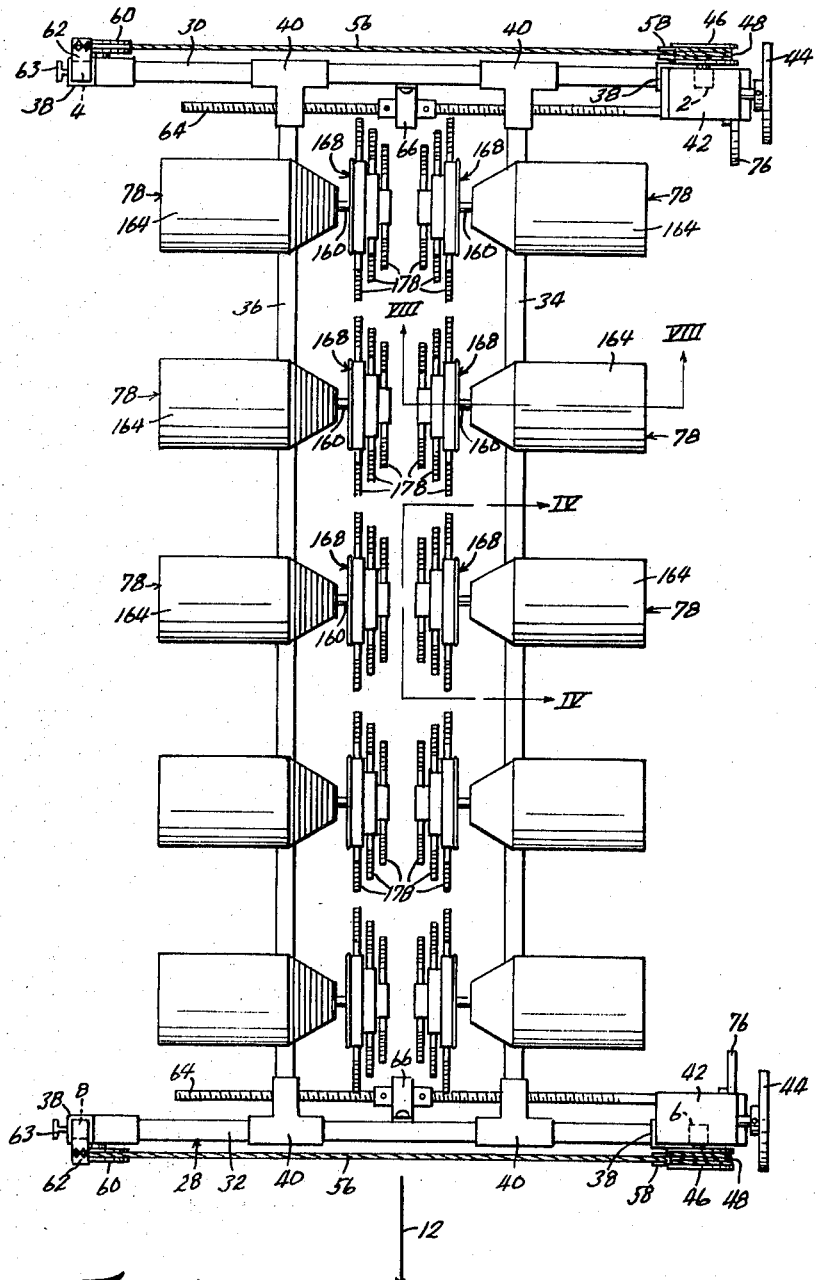

This is a continuation-in-part of our copending application Ser. No. 617,925 filed Feb. 23, 1967, and entitled, "Poultry Defeathering Apparatus."

This invention relates to new and useful improvements in poultry defeathering apparatus, and has particular reference to an "on line" picking apparatus adapted to remove feathers from birds as they are suspended from shackles and move at a uniform speed along a conveyor line. Still more specifically, the invention involves improvements in the general class of pickers including a series of picking heads disposed along each side of the path of poultry travel, each head being rotatable about an axis intersecting said path and having flexible picking fingers projecting toward said path, whereby to remove feathers from birds passing between said heads. Pickers of this class are commonly known as "disc pickers." In most pickers of this type, the fingers normally project generally parallel to the axis of head rotation and are flexible, and are bent or curved outwardly from said axis by centrifugal force as the heads are rotated, so that each finger contacts the birds with a "wiping" motion transverse to the finger, which has been found to produce an effective picking action. The centrifugal bending of the fingers is of course necessary, since otherwise only the tips of the fingers would engage the birds, and no eflective feather removal could occur. However, a problem with this type of picker has been that as the heads are rotated the fingers are under continual flexural stress due to centrifugal force, and of course are also continuously shaking or vibrating resiliently as they rotate, even when not engaging the poultry. This action, apparently by internal friction within the bodies of the fingers themselves, causes heat to be generated within the fingers. In extreme cases, as for example when rotating the heads dry for a substantial length of time, the fingers may actually be heated to such a degree as to cause melting of the rubber thereof. Ordinarily, the water which enters the picker in large quantities with the poultry, which has been scalded just previously in preparation for the picking is relied on to prevent overheating of the fingers, but even this moisture is not entirely effective, the fingers often still becoming sufficiently overheated to such an extent that they leave black rubber marks on the poultry carcasses. This is of course highly undesirable and represents financial loss, necessitating either expensive removal of the marks, or downgrading thereof to cheaper categories. The heating of the fingers also tends to remove the "temper" of the rubber fingers, so that their wear resistance is reduced. The wearing of the fingers, furthermore, appears to occur most rapidly when they are already under flexural stress when they contact the poultry, as does actual breakage of fingers. The replacement of worn and broken fingers represents a major maintenance cost in the operation of pickers, and also necessitates frequent removal of the pickers from service. This "down" time is of course expensive and disruptive in a highly mechanized, continuous process poultry plant.

The prinicpal object of the present invention is, therefore, the provision of a picking machine of the general character described in which the fingers normally project radially from the rotational axes of the heads in which they are mounted, and hence are not flexed at all by centrifugal force as the heads are rotated, but only when they actually engage the poultry. Overheating of the fingers is thereby avoided, they do not leave black marks on the poultry carcasses, the retain their temper, and their service life is markedly lengthened. Also, since the fingers then do not have to be centrifugally flexed to engage the bird with the desired sidewise wiping motion, the use of softer, more flexible fingers is permitted. This reduces the possibility of bruising, scuffing, or otherwise damaging the birds.

Another object is the provision of a picking machine of the character described in which projection of the fingers from the heads toward the vertical plane of poultry travel is obtained, despite their radial position, by including the rotational axes of the heads obliquely to said plane. This provides space between opposing heads for the passage of poultry therebetween, and presents the fingers more effectively to the poultry carcasses.

Another object is the provision, in a poultry picker of the character described, of a novel structure whereby the picking heads, both individually or conjointly, are rendered completely adjustable relative to the poultry path. These adjustments include movement of the heads horizontally along said path, horizontally at right angles to said path, vertically relative to the bird, and universal pivotability of the axis or rotation of each head. By this means, the individual heads of a single machine, or the heads of a series of like machines, may be effectively positioned to remove the feathers from each and every portion of a bird's skin area.

Other objects are simplicity and economy of construction, efficiency and dependability of operation, and ease and convenience of servicing and maintenance.

Figure 2:
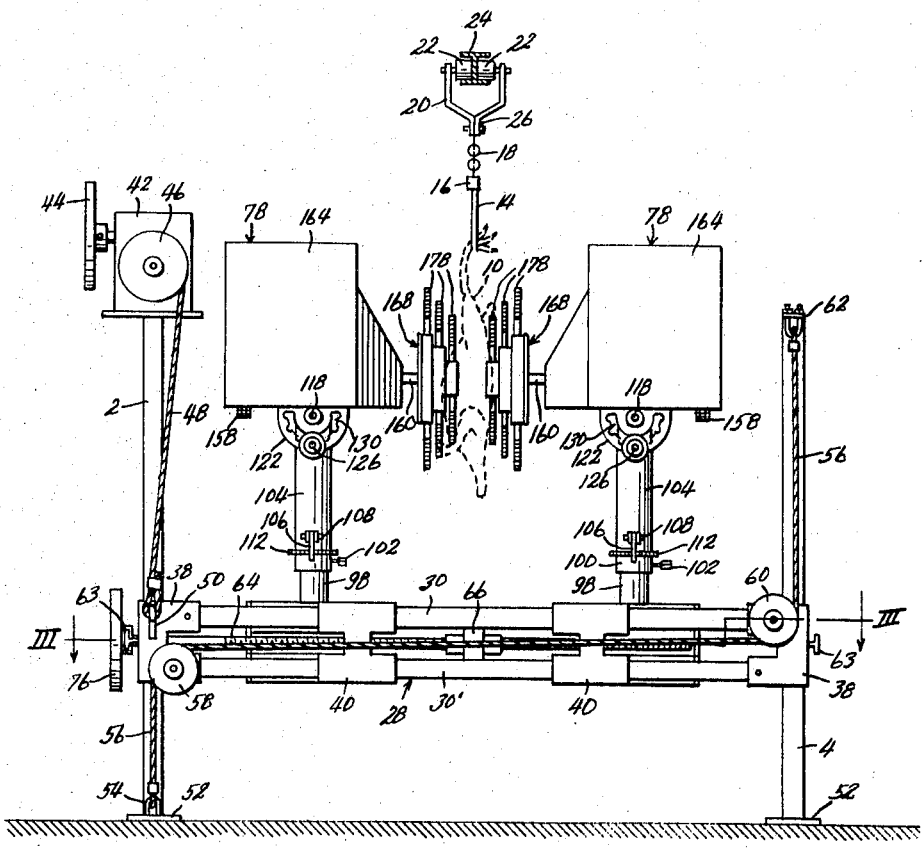
Figure 3:
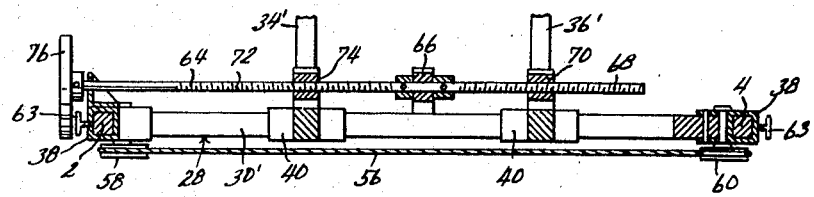
Figures 11, 12:
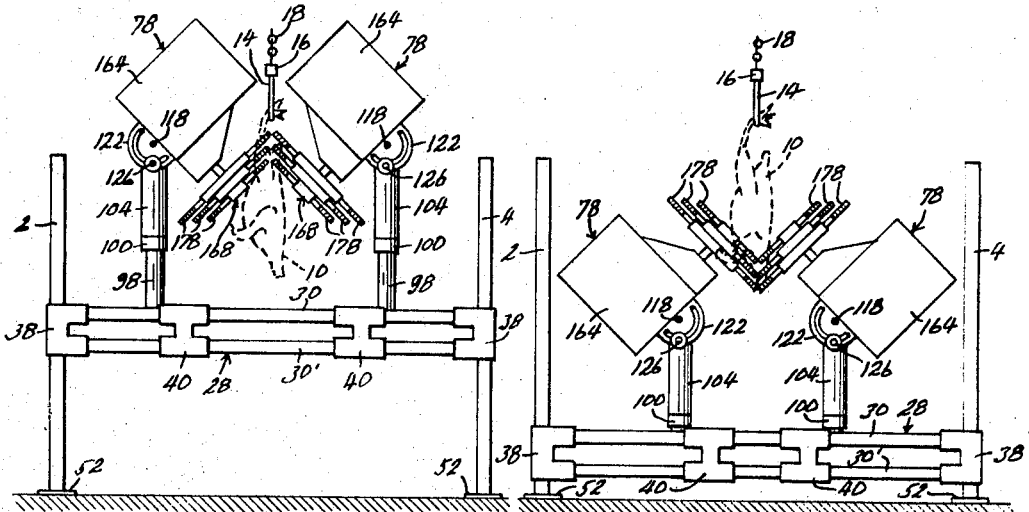
Figures 13, 14, 15:
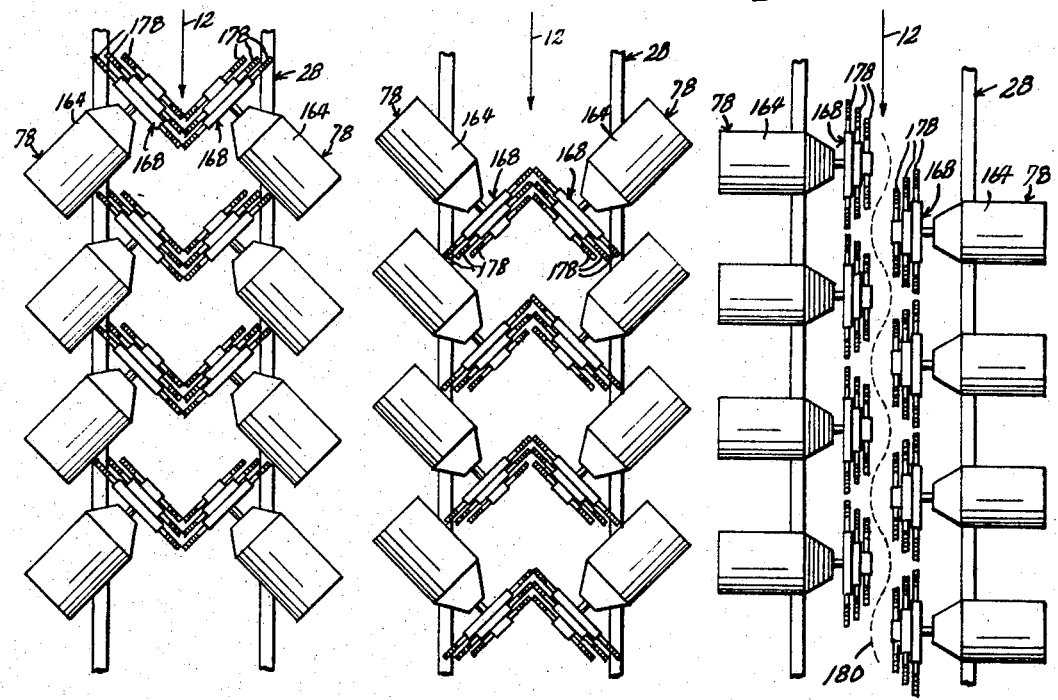

With these objects in view, as well as other objects which will appear in the course of the specification, reference will be had to the accompanying drawing, wherein:

FIG. 1 is a top plan view of a poultry defeathering apparatus embodying the present invention, some of the fingers being omitted for clarity, FIG. 2 is a front elevational view of the apparatus as shown in FIG. 1, showing the relationship of the poultry thereto, FIG. 3 is a fragmentary sectional view taken on line III—III of FIG. 2, FIG. 4 is an enlarged, fragmentary sectional view taken on line IV—IV of FIG. 1, including a face view of one of the picking heads, FIG. 5 is a sectional view of one of the picking heads, taken irregularly on line V—V of FIG. 4, FIG. 6 is a fragmentary sectional view taken on line VI—VI of FIG. 4, FIG. 7 is a fragmentary sectional view taken on line VII—VII of FIG. 4, FIG. 8 is an enlarged, fragmentary sectional view taken on line VIII—VIII of FIG. 1, FIG. 9 is a fragmentary sectional view taken on line IX—IX of FIG. 8, FIG. 10 is an enlarged sectional view taken on line X—X of FIG. 9, FIG. 11 is a reduced, schematic view similar to FIG. 2, with parts omitted, showing the picking heads positioned to remove feathers from the tail, hocks and lower abdomen and back of the birds, FIG. 12 is a view similar to FIG. 11 but showing the picking heads positioned to remove feathers from the neck, shoulders and wings of the birds, FIG. 13 is a reduced, fragmentary schematic view similar to FIG. 1 showing the picking heads angled oppositely to the direction of poultry travel to remove feathers more effectively from the leading sides of the birds, FIG. 14 is a view similar to FIG. 13 showing the picking heads angled forwardly to more effectively remove feathers from the trailing sides of the birds, and FIG. 15 is a view similar to FIG. 13 showing the picking heads at the opposite sides of the path of poultry travel staggered longitudinally of the path to produce a serpentine path and a twisting or "tumbling" action thereof.

Like reference numerals apply to similar parts throughout the several views. The apparatus or machine is supported by a main frame including a pair of generally vertical front corner posts 2 and 4 and a pair of generally vertical rear corner posts 6 and 8. Poultry, indicated at 10 in dotted lines in FIG. 2 is conveyed forwardly through the machine, in the direction of arrow 12 in FIG. 1, along a generally horizontal path midway between the corner posts at opposite sides of the machine. As shown in FIG. 2, each bird is suspended from a shackle 14 which is connected by means of a swivel connector 16 and a short flexible chain 18 to a bracket 20 having rollers 22 supporting it for movements along a conveyor track 24. The brackets 20 of the shackles are connected at intervals to a conveyor chain 26 which is driven by any suitable means, not shown, to move the shackles along the track at a generally uniform rate.

Corner posts 2, 4, 6 and 8 carry a generally horizontal platform forming a part of the main frame and designated generally by the numeral 28. Said platform includes a double cross bar 30–30' extending horizontally between front corner posts 2 and 4, and a double cross bar 32–32' extending horizontally between rear corner posts 6 and 8, and a pair of double longitudinal bars 34–34' and 36–36' extending horizontally and longitudinally of the machine between cross bars 30 and 32. Each end of each cross bar 30 and 32 is affixed to a tubular bracket 38 which is vertically slidable on the associated corner post, and each end of each longitudinal bar 34 and 36 is affixed to a tubular bracket 40 which is slidable along the associated cross bar.

Platform 28 may be adjusted vertically on the corner posts by means of a pair of gear reduction units 42 mounted respectively at the upper ends of corner posts 2 and 6. Each of said reduction units is manually operable by a handwheel 44 to turn a drum 46 on which is wound a cable or chain 48, the free end of which is extended downwardly and engaged in a hook 50 affixed to the platform bracket 38 of the associated post. Each corner post is also provided with a foot 52, and affixed to the foot of posts 2 and 6 is an eye 54 (see FIG. 2) in which is engaged one end of a cable or chain 56. The cable of each of corner posts 2 and 6 is extended upwardly and trained about a pulley 58 mounted for rotation about a longitudinal horizontal axis on the platform bracket 38 of the associated corner post. From pulleys 58, the cables 56 extend horizontally across the machine and are trained about pulleys 60 rotatably mounted on platform brackets 38 associated respectively with corner posts 6 and 8. From pulleys 60, cables 56 extend upwardly and each is attached at its upper end to a bracket 62 at the upper end of its associated corner post. Thus by turning handwheels 44, platform 28 may be raised, lowered, or tilted longitudinally of the machine, for purposes to be described. Tilting of the platform, as represented by vertical inclination of longitudinal bars 34 and 36, may result in tilting the corner posts 2, 4, 6 and 8, but this is of course permissible so long as the lower ends of said corner posts are not rigidly anchored. After the elevation of the platform has been adjusted as desired, brackets 38 may be secured in position on the corner posts by means of set screws 63.

The distance between longitudinal bars 34 and 36 may be adjusted, for purposes to be described, by means of a pair of adjusting screws 64 disposed respectively adjacent cross bars 30 and 32 and extending parallel thereto. Each of said screws (see FIG. 3) is rotatably mounted in a bearing block 66 fixed to the midpoint of the associated cross bar 30 or 32, has a threaded portion 68 threaded in a nut 70 affixed to the adjacent bracket 40 of longitudinal bar 36, an oppositely threaded portion 72 threaded in a nut 74 affixed to the adjacent bracket 40 of longitudinal bar 34, and is rotatable manually by means of a handwheel 76 affixed to one end thereof. By turning handwheels 76 equally, bars 34 and 36 may be moved closer together or farther apart, but will remain equally spaced at opposite sides of the vertical plane of poultry travel, as indicated by arrow 12 in FIG. 1. By turning handwheels 76 unequally, longitudinal bars 34 and 36 may be angled relative to each other in a horizontal plane. Brackets 40 may engage cross bars 30 and 32 with sufficient looseness to permit a limited degree of this horizontal angularity.

Carried by each of longitudinal bars 34 and 36, in longitudinally spaced relation therealong, are a series of picking elements each designated generally by the numeral 78. As best shown in FIGS. 4, 6 and 7, each element includes a mounting bracket 80 having a pair of downwardly opening channels 82 fitting respectively over the elements 34–34' or 36–36' of the associated longitudinal bar. Said channels are rigidly connected by the base portion 84 of a U-shaped connector 86, the legs 88 of said connector extending horizontally outwardly. The bracket is slidable along bar 34 or 36, and is fixable thereon by set screws 90 (see FIG. 7). Slidable on legs 88 of bracket 86 is a carrier base 92 having a pair of sockets 94 engaged over legs 88 (FIG. 6) and fixable thereon by set screw 96 (FIG. 7). Fixed to base 92 and extending upwardly therefrom is a circular post 98. Mounted on said post is a circular collar 100, said collar being rotatable and vertically slidable on said post, and being fixable thereon by set screw 102. Telescoped over the upper end portion of post 98, and extending thereabove, is a tubular post extension 104, said extension being rotatable and vertically slidable on said post, and being adapted to rest at its lower end on collar 100. A latch bar 106 pivoted at its upper end, as at 108, to post extension 104, is adapted to be engaged selectively in any of a series of angularly spaced notches 110 (FIG. 7) formed in a flange 112 of collar 100, whereby to secure post extension 104 at any desired position of angular adjustment. The post extension may then be further secured on the post by set screws 114 (FIG. 4).

A tubular bearing sleeve 116 having a horizontal transverse axis is welded to the upper end of post extension 104, and carries a pivot pin 118. A motor carrier platform 120 is disposed above pivot pin 118, and has side flanges 122 depending respectively at opposite sides of post extension 104 and pivoted on pin 118, whereby platform 120 may be tilted about said pin as an axis. Said flanges extend below pin 118, and move in wiping engagement with brackets 124 welded respectively to opposite sides of post extension 104. A clamp pin 126 extends diametrically of said post extension passing through slots 128 formed therefor in the post extension and brackets 124, and through slots 130 of flanges 122 which are concentric with pivot pin 118. Referring particularly to FIGS.

9 and 10, it will be seen that pin 126 carries on one end thereof a clamp washer 132 engaging the outer face of one of flanges 122 and secured on said pin by collar 134, and on the other end thereof a clamp washer 136 engaging the outer face of the other of flanges 122, both of said washers being slidable on said pin. At the end of said pin opposite collar 134, a lever 138 is pivoted to said pin on a transverse axis at 140, said lever having a cam surface 142 abutting the outer surface of washer 136. When said lever is pivoted in one direction, cam 142 draws washers 132 and 136 tightly against flanges 122 to secure platform 120 against pivoting on pin 118, and releases the pressure on said washers to permit pivoting of the platform when said lever is pivoted in the opposite direction.

Fixed to platform 120 and extending upwardly therefrom is a post having a lower section 144 welded to said platform and an upper section 146 telescoped slidably over said lower section and fixable thereon by set screw 148 (FIG. 9). Mounted on the upper end of post section 146 is an electric motor 150 on the driveshaft 152 of which is mounted a pulley 154. Pulley 154 is operably connected by belt 156 with a pulley 158 fixed on a shaft 160. Said shaft extends above and parallel to platform 120, being journalled in bearings 162 mounted on said platform, is disposed at right angles to the pivot pin 118 of said platform, and has its free end projecting toward the vertical plane of poultry travel. The motor, belt, and platform 120 are covered, for safety, by a sheet metal hood 164 secured to said platform by bolts 166 (FIG. 9).

A picking head 168 is mounted on the end of shaft 160 extended toward the vertical plane of poultry travel, by means of set screw 170 (see FIG. 5). Said head is circular and concentric with shaft 160, and the outer surface thereof, being that surface toward the vertical plane of poultry travel, is cylindrical coaxially with shaft 160 having three sections 172, 174 and 176, as best shown in FIGS. 4 and 5, of graduated diameters, the section 172 of smallest diameter being disposed outermost, whereby the head constitutes a stepped cone with its apex extending toward the vertical plane of poultry travel at one angle or another thereto. Fixed in each of these stepped cylindrical sections of each head are the base ends of a series of picking fingers 178. Said fingers are flexible, being formed usually of rubber, and extend, when at rest normally from said cylindrical head sections, and radially to shaft 160. They may all be of the same length, as best shown in FIGS. 4 and 5, and are preferably spaced at regular angular intervals about the periphery of each head section. They may be of different cross-sectional contours, rectangular fingers being shown, and are preferably circumferentially ribbed as shown in FIG. 5.

In operation, motors 150 are set in motion to rotate picking heads 168, usually but not necessarily all in the same direction with respect to the carcasses of the birds, and conveyor chain 26 is set in motion to move the carcasses 10 in a generally horizontal path between the opposed banks of picking heads, along the line indicated by arrow 12 in FIG. 1, whereby the feathers are engaged and removed from said carcasses by picking fingers 178. Even though the fingers are flexible, they are not normally flexed by any forces resulting from rotation of the heads, but remain radially extended except when deflected by actual contact with the poultry carcasses. As previously discussed, this freedom from continuous flexure, as occurs in disc pickers the fingers of which are flexed outwardly by centrifugal force as the heads rotate, avoids overheating of the fingers with consequent damage to the wear properties and service life of the fingers, or possible marking of the carcasses. Also, since the fingers need not be stiffened to resist centrifugal flexure thereof, the present structure permits the use of softer, more flexible fingers, which further contributes to gentle picking with less bird damage. Also, while the present pickers utilizing centrifugal finger deflection do so to position the fingers to engage the bird with a sidewise wiping motion transverse to the longitudinal extent of the fingers themselves, the same finger positioning is provided in the present structure without the undesirable effects of flexure. This type of finger motion has been found to produce a very effective picking action, as compared to the more common "drum picker" in which fingers are mounted on and project from the surface of a generally cylindrical drum and the carcasses are moved parallel to the drum axis in engagement with the fingers, for at least two reasons. First, in the drum picker each finger tends to be drawn over the bird lengthwise of itself, and so tends to remove feathers in only a very narrow strip, while in the disc picker the lateral motion of each finger enables it to cover and remove feathers from a comparatively much greater area of the carcass. Second, in a drum picker the fingers in general impinge against the bird normally to the surface thereof, with the result that they often "rebound" away from the bird so rapidly that their picking efficiency is impaired. Also, the "beating" administered to the birds by fingers with this type of motion often breaks wings, loosens skin, and otherwise damages the birds. For this reason, it is quite customary to impose a top limit on the linear speed of the fingers to avoid undue damage. In the disc picker, on the other hand, the fingers generally approach the birds at much more acute angles to the surfaces of the carcasses, whereby to avoid excessive "beating" so as to permit higher finger speed and more efficient picking with less damage to the birds, and with less possibility of rebounding.

The "stepping" of each picking head 168, so that the fingers of each step project radially outwardly to different distances also has certain advantages. It provides a radially broader "picking surface," so as to cover larger areas of the bird, without requiring longer fingers. Longer fingers tend to be too limp to perform effectively, and at best would require careful redesigning for stiffness and flexibility characteristics. Moreover, the ability of machine to use a single uniform finger at all locations is itself a valuable economy in operation and maintenance, since only one finger style need be stocked. The "picking surface" offered by each head is generally conical, or frustoconical. This provides, when desired, a tapered entry "mouth" for the poultry between opposed heads, and thereby eliminates any tendency of the heads to reject or "throw aside" any poultry carcasses attempting to enter therebetween. Furthermore, if desired, the picking surface presented by each head toward the plane of poultry travel may, if desired, be arranged substantially parallel to said plane, by tilting the rotational axes of the heads relative to said plane as shown in FIGS. 11–15. This adjustment will be more thoroughly discussed below.

Other advantages of the present structure, both apart from and in combination with the radial positioning of the fingers and the stepped cylindrical heads, lie in the virtually limitless flexibility in the disposition of the picking heads relative to the poultry carcasses. Handwheels 44 permit complete vertical adjustment of the heads relative to the birds, so that the picking action may be concentrated at any desired elevation of the bird. By turning handwheels 44 unequally, the banks of picking heads may be tilted vertically so that as the birds move horizontally, successive opposed pairs of heads will gradually traverse the bird from top to bottom, or vice versa, as may be desired. Turning of handwheels 76 moves the opposed banks of heads closer together or farther apart, as may be dictated by the size of the poultry being defeathered. By turning handwheels 76 unequally, the opposed banks may be relatively angled in a horizontal plane, as for example to provide that successive opposed heads between which each bird passes will be disposed progressively closer together. This may be desirable to provide the progressively greater picking pressure of the fingers against the bird which may be required to remove the final, more tightly connected feathers. These, of course, are general adjustments each involving simultaneous movement of all of the picking heads.

Perhaps even more important are the means providing for adjustment of each picking element 78 individually, to vary its position relative to the birds independently of the position of other elements. Each element can be adjusted longitudinally of the poultry path by loosening its set screws 90 and moving its bracket 80 along longitudinal bar 34 or 36, can be adjusted toward or from the vertical path of poultry travel by loosening set screw 96 and sliding base 92 on legs 88, can be adjusted vertically by loosening set screws 114 and sliding post extension 104 on post 98, can be pivotally adjusted about a vertical axis by rotating post extension 104 on post 98, and pivotally adjusted about a horizontal axis by loosening clamp pin 126.

The latter two adjustments permit universal adjustment of the angularity of shafts 160 relative to the vertical plane of poultry travel, although the extended axes of said shafts will always intersect said plane. This adjustment is very important in adapting the machine to remove feathers most effectively from any selected portions of the birds. Actually, the heads would probably seldom be used in precisely the position shown in FIGS. 1 and 2, that is, with their rotational axes at right angles to the vertical plane of poultry travel. In this position, it will be seen that any carcass narrow enough to pass between opposed heads would not be engaged by fingers 178. Nevertheless, this position may be used, particularly with opposed heads still more closely spaced, by adjusting said heads vertically so that the poultry passes either entirely above or entirely below the head shafts 160, and hence moves through the upwardly opening V-shaped trough defined in skeleton form by the upper portions of the heads, or through the downwardly opening V-shaped trough defined in skeleton form by the lower portions of the heads. In fact, this arrangement is quite effective when picking large, plump birds.

More commonly however, the rotational axes of the heads would be inclined, in one degree or another, in any of the directions shown in FIGS. 11-14. Such inclination of the head axes of course provides that the fingers of each head project from the head toward the vertical plane of poultry travel as the head is rotated, thus making the fingers fully effective even against carcasses which are positioned vertically to pass directly between opposed heads. Whenever the poultry carcasses, or at least the thickest portions of said carcasses, are positioned vertically to intersect the head axes as they move through the machine, at least a degree of such inclination of the head axes is a virtual necessity.

However, the inclination of the head axes has other advantages also. For example, the shafts of opposed heads could be angled downwardly toward the bird, thereby bringing the upper fingers of said heads closer together to more effectively remove feathers from the narrower upper portions of the bird, such as the hocks and tail. This disposition of the heads is illustrated in FIG. 11. They could also be angled upwardly toward the bird to bring the lower fingers closer together to remove feathers more effectively from the narrower lower positions of the bird, such as the wings, shoulders and neck. This disposition of the heads is illustrated in FIG. 12. Also, the shafts could be angled either forwardly or rearwardly relative to the direction of travel of the birds, as shown respectively in FIGS. 14 and 13, whereby to remove feathers more effectively from either the leading or trailing sides of the birds. These adjustments of angularity of shafts 160 may of course require variations in the longitudinal spacing, vertical elevation, and transverse spacing of picking heads at one side of the path, as well as opposed heads at opposite sides of the path, but these can be accomplished readily by means of the longitudinal, transverse and vertical adjusting means already described. In order not to interfere with the individual adjustability of each picking head, each picking element is provided with its own individual driving motor 150, and it will be understood that electric power is supplied to each of said motors by means of a slack, flexible cable.

FIG. 15 shows another interesting possibility in the disposition of the heads, in which the heads at the opposite sides of the vertical plane of poultry travel are relatively staggered longitudinally of the path of travel, and are moved somewhat closer together. This forces the birds to follow a more or less sinuous or serpentine path through the machine, as indicated by line 180, causing them to swing on shackle chains 18 and to twist about shackle swivels 16, producing a sort of "tumbling" action which under some circumstances is highly desirable since it exposes all portions of the birds to the picking action of the fingers in a more or less random pattern.

It should be borne in mind, however, that the positions of the heads shown in the drawing are merely a small number of the almost limitless number of combinations possible. The vertical angling of the heads shown in FIGS. 11 and 12 could, for example, be combined in any degree with the horizontal angling of the heads shown in FIGS. 13 or 14, or with the staggered relationship of the heads shown in FIG. 15, as well as with the horizontal, vertical and longitudinal linear adjustments already discussed.

Also, the individual heads of the machine may be adjusted independently of each other. Thus successive pairs of picking heads of the single machine as shown may be set to pick different portions of the birds, so that said birds are completely picked as they travel the length of the machine. This has been found efficient on low-speed conveyor systems, although each portion of the bird may then be subjected to the most concentrated and effective action of only one or two pairs of picking heads. On higher speed conveyors, where inefficient picking might result from exposure of each part of the carcasses to only one or two pairs of heads, a series of machines as shown may be placed in end-to-end relation along a conveyor, with all or most of the heads of each machine set to concentrate on one particular part of the carcasses. A series of three machines as shown has been found fully effective to pick efficiently all parts of the carcasses even on a high-speed conveyor. This pinpointed or "localized" picking of the birds further tends to reduce damage to the birds, in that once a given portion of a bird has been picked, it need not be subjected to further beating by the fingers. In all other machines within our knowledge, having heads only in spatially fixed relation, effective removal of feathers from certain hard-to-pick areas can be obtained only by further subjection of the bird to the same picking heads, and this results in needless and excessive finger action against parts of the bird already cleanly picked. As previously discussed, this can cause substantial damage to the birds.

Another advantage resulting from the individual and entirely self-contained character of each picking element 78 is ease and convenience of service and maintenance. By loosening set screws 90 of one element, that entire element may be lifted free of the machine by disengaging channels 82 of base bracket 80 free of longitudinal bars 34-34' or 36-36', so that that element may be repaired or serviced with no necessity of removing the entire machine from service. Also, by switching an element 78 to the other side of the path of poultry travel and reversing the direction of rotation thereof, the opposite longitudinal edges of its picking fingers can be brought into play. This substantially doubles the effective life span of the fingers, and hence provides a very valuable economy. Furthermore, any desired number of picking elements can be positioned at either side of the path, as may be desired. Longitudinal bars 34 and 36 of any desired length can be substituted, for accommodating the desired picking elements.

What we claim as new and desire to protect by Letters Patent is:

1. In a poultry defeathering apparatus a pair of spaced apart, substantially parallel rows of separate, longitudinally spaced picking elements, each including:
    a picking head rotatable about an axis intersecting the vertical plane of the path of travel of poultry between said rows, and
    a plurality of flexible picking fingers each fixed at one end in said head and projecting outwardly therefrom radially to its axis of rotation.

2. The structure as recited in claim 1 wherein the rotational axis of said head is disposed obliquely to said vertical plane of poultry travel, whereby said picking fingers project from said head toward said plane as said head is rotated.

3. The structure as recited in claim 1 wherein each of said heads has surfaces which are cylindrical coaxially with the rotational axis of said head, and wherein said picking fingers extend normally from said cylindrical surfaces.

4. The structure as recited in claim 3 wherein each of said heads has a series of said cylindrical surfaces of graduated diameters, whereby said head constitutes a stepped cone with its apex toward said vertical plane of poultry travel.

5. The structure as recited in claim 4 wherein all of said picking fingers are of substantially equal length, whereby the outer ends thereof define a substantially conical surface.

References Cited
UNITED STATES PATENTS

| | | |
|---|---|---|
| 1,857,832 | 5/1932 | Bailey. |
| 2,991,497 | 7/1961 | McKinley et al. _____ 17—11.1 |
| 3,235,904 | 2/1966 | Brown et al. _____ 17—11.1 |
| 3,273,198 | 9/1966 | Tomlinson _____ 17—11.1 |
| 3,277,515 | 10/1966 | Engkjer et al. _____ 17—11.1 |

LUCIE H. LAUDENSLAGER, Primary Examiner